United States Patent
Brown et al.

(10) Patent No.: US 8,437,065 B2
(45) Date of Patent: May 7, 2013

(54) SCANNING PLATFORM HAVING ASYMMETRIC FLEXURES

(75) Inventors: Dean R. Brown, Lynnwood, WA (US); Wyatt O. Davis, Bothell, WA (US)

(73) Assignee: Microvision, Inc., Redmond, WA (US)

( * ) Notice: Subject to any disclaimer, the term of this patent is extended or adjusted under 35 U.S.C. 154(b) by 351 days.

(21) Appl. No.: 12/906,864

(22) Filed: Oct. 18, 2010

(65) Prior Publication Data
US 2012/0092738 A1  Apr. 19, 2012

(51) Int. Cl.
*G02B 26/08* (2006.01)

(52) U.S. Cl.
USPC ........................................ 359/224.1; 359/904

(58) Field of Classification Search .... 359/198.1–199.4, 359/200.6–200.8, 202.1, 221.2, 223.1–225.1, 359/226.2, 904, 290–295, 838, 846, 871, 359/872; 250/204, 559.06, 559.29, 230, 250/234; 347/255–260; 353/39, 98–99; 385/15–18, 22; 398/12, 19, 45
See application file for complete search history.

(56) References Cited

U.S. PATENT DOCUMENTS

2008/0239252 A1* 10/2008 Konno et al. .................... 353/98
2009/0185248 A1*  7/2009 Torashima et al. ........ 359/198.1

* cited by examiner

*Primary Examiner* — Jennifer L. Doak
(74) *Attorney, Agent, or Firm* — Kevin D. Wills (57) ABSTRACT

Briefly, in accordance with one or more embodiments, a scanning platform to scan a beam as a projected image comprises a frame and a scanning mirror supported by a flexure coupled to the frame of the scanning platform. The flexure has an asymmetric structure comprising a longer flexure arm and a shorter flexure arm to locate the scanning mirror at a position offset from a center of the frame. The resonant frequency of oscillation of the scanning mirror may be maintained or otherwise determined by selecting an appropriate cross-sectional area of the longer flexure arm or the shorter flexure arm, or combinations thereof.

18 Claims, 6 Drawing Sheets

SCANNING PLATFORM HAVING ASYMMETRIC FLEXURES

BACKGROUND

In some designs of a display system, it may be helpful to locate the scanning mirror of a scanning platform as close as possible to an exit window or to a side of the housing to result in a smaller sized housing and an overall smaller form factor of the display. This is because the further away from the exit window the scanning mirror is located, the larger the scan cone will be at the exit window which requires the exit window and/or the housing to be larger to accommodate the larger sized scan cone in order to avoid clipping of the scan cone. For some configurations of the display system, for example in a two scanning platform system, the length of a symmetrical flexure supporting the scanning mirror may prevent the scanning mirror from being positioned at an optimal location such as closer to the exit window, resulting in a size penalty, a scan cone that is too large at the exit window, and/or difficulty in designing a suitable optical path.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
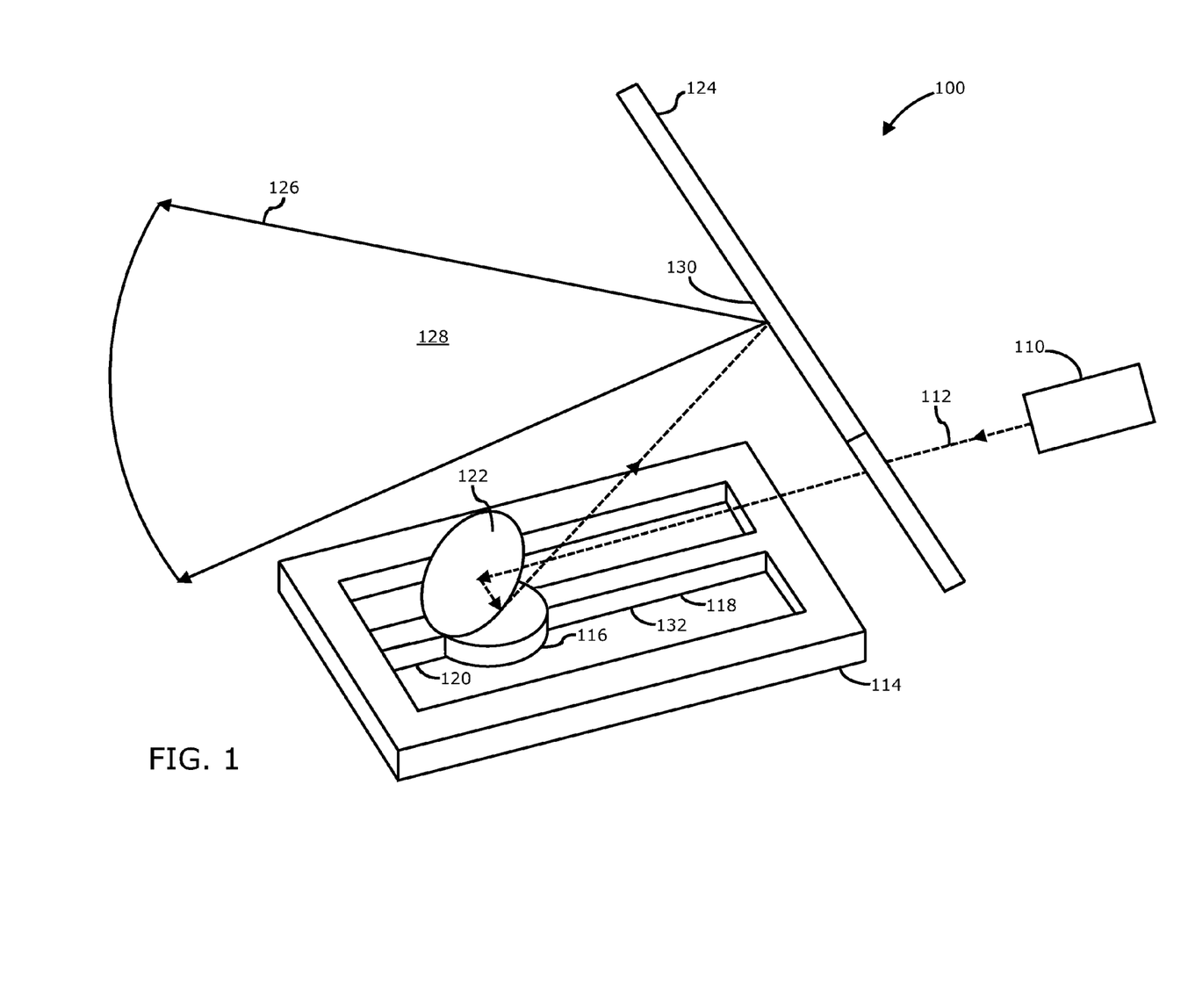
FIG. 1 is an isometric diagram of a two mirror scanned beam display having a scanning platform with an asymmetric flexure in accordance with one or more embodiments.
Figure 2:
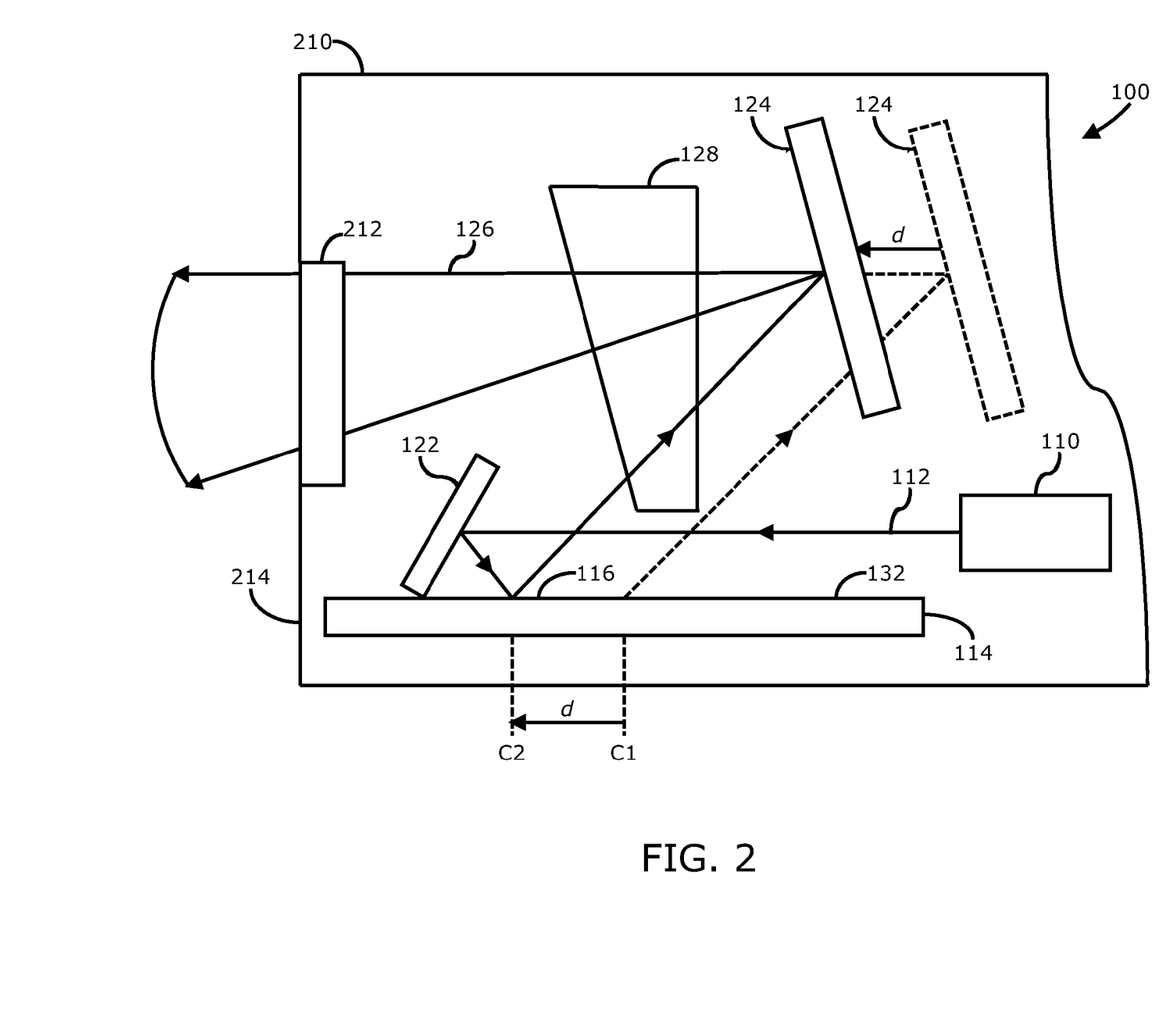
FIG. 2 is an elevation view of the two mirror scanned beam display of FIG. 1 having a scanning platform with an asymmetric flexure in accordance with one or more embodiments.

Referring now to FIG. 1, an isometric diagram of a two mirror scanned beam display having a scanning platform with an asymmetric flexure in accordance with one or more embodiments will be discussed. As shown in FIG. 1, scanned beam display 100 may comprise a light sourced 110 to generate a light beam 112 to be scanned by the display 100 to project an image on a projection surface. An example of how such a scanned beam display 100 operates is shown in and described with respect to FIG. 5, below. In the embodiment shown in FIG. 1, scanned beam display 100 comprises a two scanner system in which a first scanning platform 114 is utilized to scan the beam 112 along a first axis, and scanning platform 124 (shown generally in an end view in FIG. 1 due to its angle), scans the beam 112 in along a second axis which may be orthogonal to the first axis to generate a two-dimensional raster for drawing the projected image. In one or more embodiments, scanning platform 114 may be utilized for the fast scan axis of scanned beam display 100, and scanning platform 124 may be utilized for the slow scan axis of scanned beam display 100, although the scope of the claimed subject matter is not limited in this respect. In one or more embodiments of a two scanner system, the beam 112 impinges on a fold mirror 122 which redirects the beam 112 onto the scanning mirror 116 of scanning platform 114. Scanning mirror 116 is driven to rotate about a flexure 132 which may comprise flexure arm 118 and flexure arm 120, to reflect the beam 112 onto scanning platform 124 and to scan the beam 112 along the first axis via the rotational movement of the scanning mirror 116. The beam 112 then impinges on a scanning mirror 130 of scanning platform 124 to reflect the beam 112 into a scan cone 126 and to scan the beam 112 along the second axis via the rotational movement of scanning mirror 130. In some embodiments, scanned beam display 100 may include a prism 128 (not shown) or wedge or similar optical element or elements to provide desired optical adjustments to the beam 112 as it exits scanned beam display 100 within scan cone 126. For example, prism 128 may operate to compensate optical distortions such as keystone, parallelogram, and/or some types of pincushion distortion, and/or any arbitrary or intentional type of distortion including but not limited to distortion from a varying surface profile or relief. It should be noted that prism 128 is not shown in FIG. 1 other than by its reference number 128 for purposes of clarity of FIG. 1, but is shown in FIG. 2, below. In one or more embodiments and as will be further discussed, below, either or both of scanning platform 114 and/or scanning platform 124 may utilize an asymmetric flexure to allow scanning mirror 116 and/or scanning mirror 130 to be positioned in a desirable position according to the design requirements of scanned beam display. An elevation view of the scanned beam display is shown in and described with respect to FIG. 2, below.

Referring now to FIG. 2, an elevation view of the two mirror scanned beam display of FIG. 1 having a scanning platform with an asymmetric flexure in accordance with one or more embodiments will be discussed. The scanned beam display of FIG. 1 is shown in FIG. 2 in an elevation view and includes the same elements as shown in and described with respect to FIG. 1. In addition, FIG. 2 shows scanned beam display 100 disposed within a housing 210 having an exit window 212 or port through which the scanned beam 112 may exit the housing 210 within scan cone 126. In some embodiments, exit window 212 is merely an opening in the side 214 of housing 212, and in other embodiments exit window 212 is an optic or a transparent covering over or disposed in an opening in the side 214 of housing 212. In some embodiments, the exit window 212 and prism 128 may comprise the same element and/or the prism 128 may be disposed in the exit window 212, or alternatively exit window 212 and prism 128 may be separate elements. However, the scope of the claimed subject matter is not limited in these respects.

Furthermore, as shown in FIG. 2, the scanning mirror 116 of scanning platform 114 is shown as moved from having its center positioned at location C1 to location C2. Location C1 may represent a version of scanning platform 114 having a generally symmetrical flexure 132 such that scanning mirror 116 is positioned at or near the center of scanning platform 114. In this version of scanning platform 114, the length of flexure arm 118 is equal to or approximately equal to flexure arm 120. Location C2 may represent a version of scanning platform 114 having an asymmetric flexure 132 such that scanning mirror 116 is positioned closer to the side 214 of housing 210 by a distance, d, such that the arrangement of the elements of scanned beam display 100 may fit within housing 210 according to design specifications, for example to be as close as possible to exit window 212 and/or to provide a more compact arrangement of the scanned beam display 100 to fit within a smaller sized housing 210. For example, when scanning platform 114 has a symmetrical flexure 132, scanning mirror 116 is located at position C1 which would require the other scanning platform 124 to be positioned further away from the side 214 of housing 214, and which would then require a larger sized housing 214. Furthermore, when scanning mirror 116 is located at position C1 and scanning platform 124 is positioned further away from the side 214 of housing, the scan cone 126 would be larger when it hits exit window 212, which would either block or clip a portion of the scan cone 126 where the exit window 212 and housing 210 are smaller sized, or which otherwise would require a larger sized exit window 212 and/or a larger sized housing 210 to accommodate the larger size of the scan cone 126 at exit window 212. By supporting the scanning mirror 116 with an asymmetric flexure 132, scanning mirror 116 may be positioned at position C2 to allow for a generally more compact arrangement of the elements of scanned beam display 100 including a smaller exit window 212 and/or smaller housing 210, although the scope of the claimed subject matter is not limited in these respects. For example, by moving scanning mirror 116 from position C1 to position C2 by a distance, d, scanning platform 124 may be likewise moved a distance, d, closer to side 214 of housing 210, which may allow for an overall smaller sized arrangement of scanned beam display 100 and which may fit within a smaller sized package or housing 210 than would otherwise be required with a symmetric flexure 132. It should be noted that one or both of scanning platforms 114 and 124 may utilize an asymmetric flexure 132 according to the design specifications of scanned beam display 100, and the scope of the claimed subject matter is not limited in these respects. Further details of an example asymmetric flexure are shown in and described with respect to FIG. 3, below.

Figure 3:
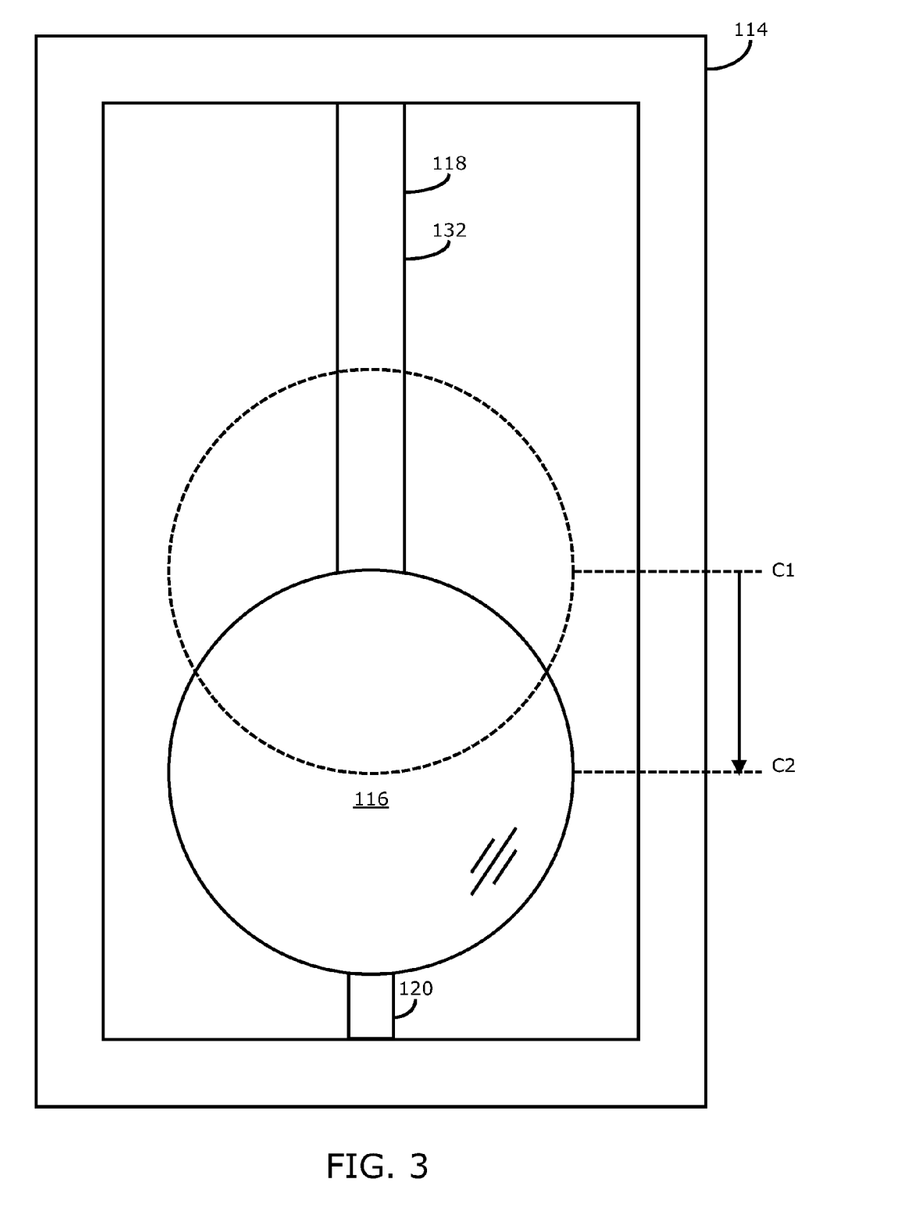
FIG. 3 is a top plan view of a scanning platform having a scanning mirror supported by an asymmetric flexure in accordance with one or more embodiments.

Referring now to FIG. 3, a top plan view of a scanning platform having a scanning mirror supported by an asymmetric flexure in accordance with one or more embodiments will be discussed. As shown in FIG. 3, scanning mirror 116 may be supported by an asymmetric flexure 132 that comprises a first flexure arm 118 and a second flexure arm 120. Flexure 132 may be regarded as asymmetric in that flexure arm 118 may be longer than flexure arm 120 which as a result positions scanning mirror 116 at position C2 rather than at position C1 which represents the case where flexure arm 132 is symmetric. Flexure arm 118 and flexure arm 120 may further have different cross-sectional dimensions. Scanning mirror 116 may be driven to rotate about an axis defined by the flexure 132 such that flexure arm 118 and flexure arm 120 are subject to rotational twist as the scanning mirror 116 rotates.

In one or more embodiments, scanning platform 114, flexure 132, and/or scanning mirror 116 are fabricated at least in part from a material such as silicon or other suitable material as a microelectromechanical system (MEMS) device. An electrical or electrostatic circuit (not shown) may be energized with a suitable drive signal to cause scanning mirror 116 to rotate about an axis defined by the flexure 132. The physical properties of flexure arm 118, flexure arm 120, and scanning mirror 116, and the properties of the material from which they are fabricated, define a mechanical system having a resonant frequency of oscillation when scanning mirror 116 is caused to rotate. In some embodiments, scanning mirror 116 may be resonantly or non-resonantly driven, and the scope of the claimed subject matter is not limited in this respect. The frequency of oscillation may be defined at least in part by the length and/or cross-sectional area of the flexure 132, and designed to a desired design specification, for example to the scanning frequency of the raster pattern to be generated by scanned beam display 100 for the particular scanning axis for which scanning platform 114 is utilized. A scanning platform 114 having a symmetric flexure 132 may have the first flexure arm 118 and the second flexure arm 120 at the same length and/or the same cross-sectional area in which the resonant frequency of the motion of scanning mirror 116 is a desired design frequency. When an asymmetric flexure 132 is provided, the resulting resonant frequency may be different than the resonant frequency where a symmetric flexure is utilized due to the different lengths of flexure arm 118 and flexure arm 120. In order to have the resonant frequency of the scanning platform 116 with an asymmetric flexure 132 be at a desired frequency, the cross-sectional area of flexure arm 118 and flexure arm 120 may be selected according to the lengths of the corresponding flexure arms. For example, a longer flexure arm 118 may have a larger cross-sectional area, and a shorter flexure arm 120 may have a smaller cross-sectional area, wherein a combination of the lengths of the flexure arms and their respective cross-sectional areas may be selected to result in the desired resonant frequency of the scanning mirror 116.

In one or more embodiments, the length of one of the flexure arms of an asymmetric flexure 312 may be zero such that scanning mirror 116 is supported by only one flexure arm. For example, the length of flexure arm 120 may be zero in that it does not exist, and scanning platform is supported by just flexure arm 118 in a cantilever arrangement. Note that in a cantilever arrangement when flexure arm 120 is not existent, scanning platform 116 is not attached to the body of scanning platform 114 other than via flexure arm 118. Although such a single flexure arm cantilever embodiment is within the scope of the claimed subject matter, generally an asymmetric flexure 132 may include two flexure arms to minimize or avoid motion of scanning mirror 116 outside the plane of scanning platform 114 via inadvertent cantilever movement so that motion of scanning platform 116 is primarily contained to just rotational movement about an axis of rotation. Thus, by changing the lengths of the flexure arms 118 and 120, and their cross-sectional areas, scanning mirror 116 may be positioned at any desired position along flexure 132, and a desired resonant frequency of oscillation of the scanning mirror 116 may be selected. An example in which an asymmetric flexure 132 may be utilized to offset the position of scanning mirror 116 in two directions of offset is shown in and described with respect to FIG. 4, below.

Figure 4:
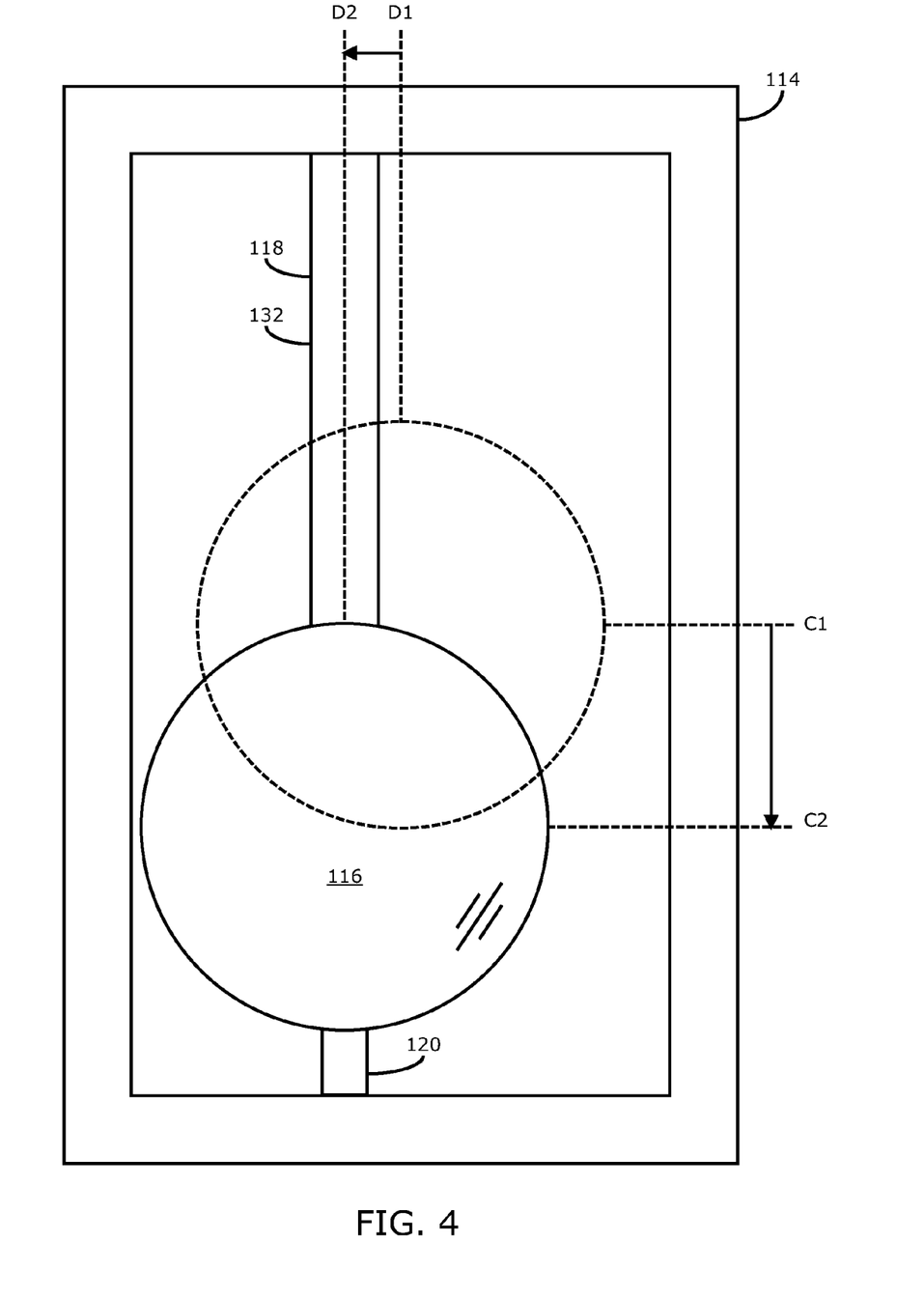
FIG. 4 is a top plan view of an alternative scanning platform supported by an asymmetric flexure in accordance with one or more embodiments.

Referring now to FIG. 4, a top plan view of an alternative scanning platform supported by an asymmetric flexure in accordance with one or more embodiments will be discussed. The scanning platform 114 shown in FIG. 4 is substantially similar to the scanning platform 114 shown in FIG. 3 except that, in addition to the scanning mirror 116 being displaced from position C1 to position C2 via the structure of asymmetric flexure 132, the scanning mirror 116 is also displaced from position D1 to position D2 such that scanning mirror 116 is moved to a corner of the body of scanning platform 114 wherein the central axis of asymmetric flexure 132 is displaced away from the center of scanning platform 114. In such an arrangement, scanning mirror 116 may be positioned at any desirable position within scanning platform 114 to be positioned closer to adjacent optical elements in scanning platform 100 to minimize or reduce the size of scanning platform 100 within housing 210 and/or closer to exit window 212 as discussed herein. In one or more alternative embodiments, scanning platform 114 may comprise a biaxial scanner having two scan axes, for example wherein the frame of scanning platform 114 is itself supported within another outer frame by another asymmetric flexure similar to asymmetric flexure 132 so that scanning mirror 116 is disposed toward a corner of the overall structure of scanning platform 114, however the scope of the claimed subject matter is not limited in this respect. In general, the positioning of the scanning mirror 116 via an asymmetric flexure 132 may be based at least in part on the design specification of the particular scanned beam display 100. Such an example scanned beam display 100 is shown in and described with respect to FIG. 5, below.

Figure 5:
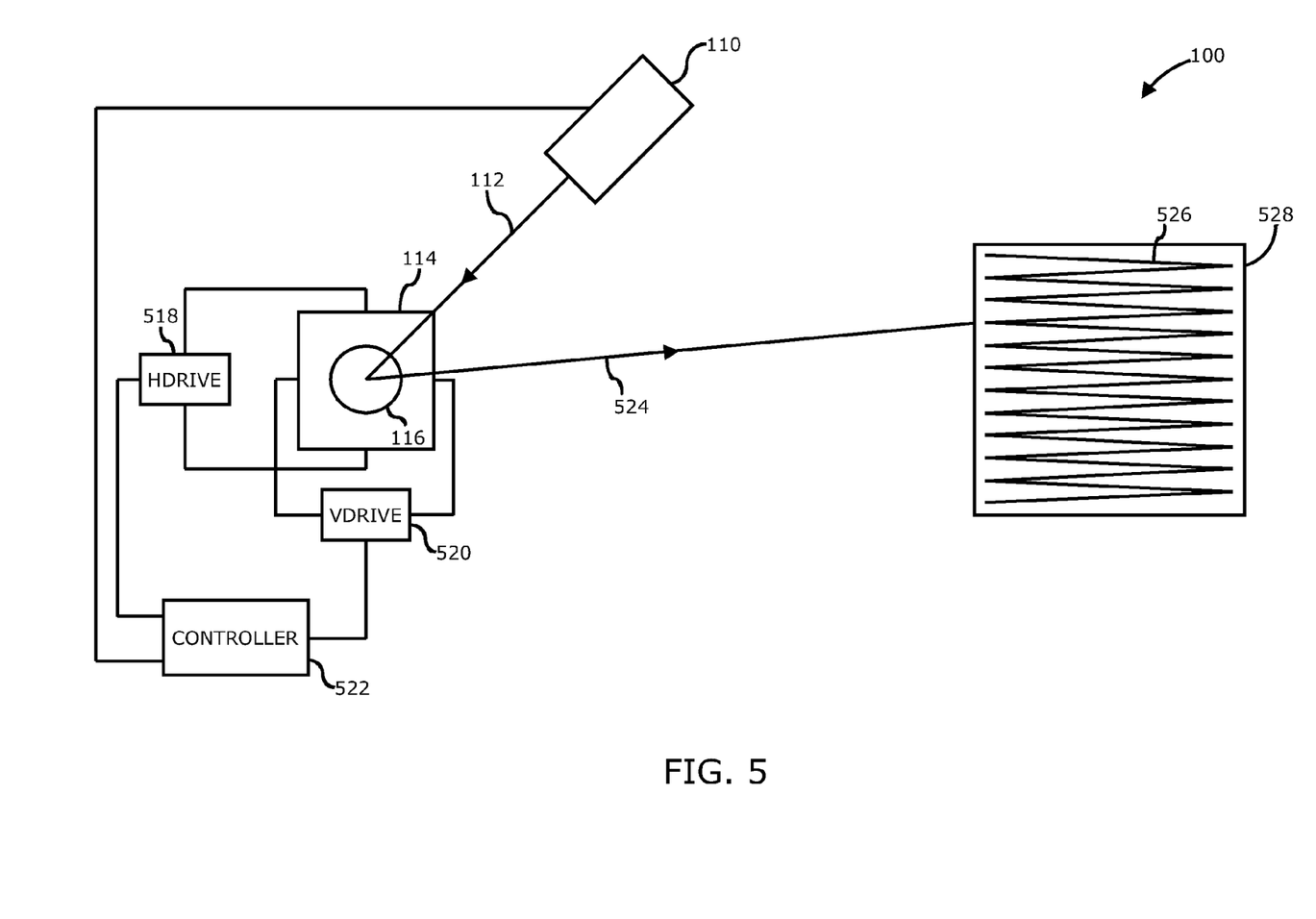
FIG. 5 is a diagram of a scanned beam display capable of utilizing a scanning platform having an asymmetric flexure in accordance with one or more embodiments.

Referring now to FIG. 5, a diagram of a scanned beam display capable of utilizing a scanning platform having an asymmetric flexure in accordance with one or more embodiments will be discussed. Although FIG. 5 illustrates one type of a scanned beam display 100 for purposes of discussion, for example a microelectromechanical system (MEMS) based display, it should be noted that other types of scanning displays including those that use two uniaxial scanners as shown in FIG. 1 and FIG. 2, or other types of displays utilizing support flexures for scanning, may also utilize the claimed subject matter and the scope of the claimed subject matter is not limited in this respect. Details of operation of an example scanned beam display are discussed, below.

As shown in FIG. 5, scanned beam display 100 comprises a light source 110, which may be a laser light source such as a laser or the like, capable of emitting a beam 112 which may comprise a laser beam. In some embodiments, light source 112 may comprise two or more light sources, such as in a color system having red, green, and blue light sources, wherein the beams from the light sources may be combined into a single beam 112. In one or more embodiments, light source 110 may include three full color light sources such as a red light source, a green light source, and blue light source, and in addition may include a fourth light source to emit an invisible beam such as an ultraviolet beam or an infrared beam. The beam 112 is incident on a scanning platform 114, (and also on scanning platform 124 in a two scanner system as shown in FIG. 1 and FIG. 2), which may comprise a microelectromechanical system (MEMS) based scanner or the like in one or more embodiments, and reflects off of scanning mirror 116, and then scanning mirror 130 in a two scanner system, to generate a controlled output beam 524. In one or more alternative embodiments, scanning platform 114 may comprise any device that may incorporate an asymmetric flexure as discussed herein. A horizontal drive circuit 518 and/or a vertical drive circuit 520 modulate the direction in which scanning mirror 116 is deflected to cause output beam 524 to generate a raster scan 526, thereby creating a displayed image, for example on a display screen and/or image plane 528. A display controller 522 controls horizontal drive circuit 518 and vertical drive circuit 520 by converting pixel information of the displayed image into laser modulation synchronous to the scanning platform 114 to write the image information as a displayed image based upon the position of the output beam 524 in raster pattern 526 and the corresponding intensity and/or color information at the corresponding pixel in the image. Display controller 522 may also control other various functions of scanned beam display 100.

In one or more embodiments, for two dimensional scanning to generate a two dimensional image, a horizontal axis may refer to the horizontal direction of raster scan 126 and the vertical axis may refer to the vertical direction of raster scan 526. Scanning mirror 116 of scanning platform 114 may sweep the output beam 524 horizontally at a relatively higher frequency, and scanning mirror 130 of scanning platform 124 may sweep the output beam 524 vertically at a relatively lower frequency. The result is a scanned trajectory of laser beam 524 to result in raster scan 526. The fast and slow axes may also be interchanged such that the fast scan is in the vertical direction and the slow scan is in the horizontal direction. However, the scope of the claimed subject matter is not limited in these respects.

In one or more particular embodiments, the scanned beam display 100 as shown in and described with respect to FIG. 1, FIG. 2, and FIG. 5 may comprise a pico-projector developed by Microvision Inc., of Redmond, Wash., USA, referred to as PicoP™, or a similar type of projector. In such embodiments, light source 110 of such a pico-projector may comprise one red, one green, and one blue laser to form a multicolor beam 112. Modulating the lasers synchronously with the position of the scanned output beam 524 may create the projected image. In one or more embodiments the scanned beam display 100, or engine, may be disposed in a single module known as an Integrated Photonics Module (IPM) or generically as a display module, which in some embodiments may be 7 millimeters (mm) in height and less than 5 cubic centimeters (cc) in total volume, although the scope of the claimed subject matter is not limited in these respects.

Figure 6:
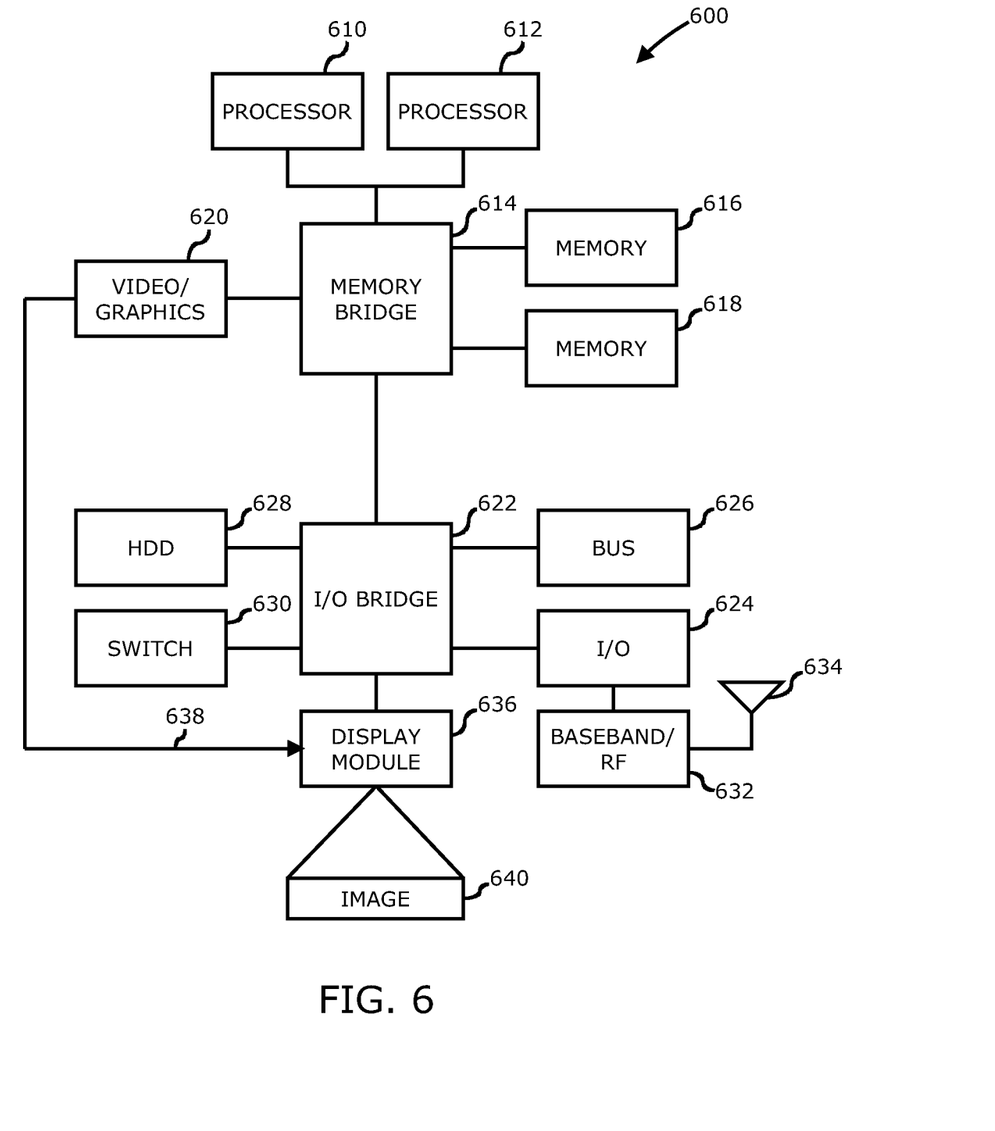
FIG. 6 is a block diagram of an information handling system with a display module with a scanning platform having asymmetric flexures in accordance with one or more embodiments.

Referring now to FIG. 6, a block diagram of an information handling system with a display module with a scanning platform having asymmetric flexures in accordance with one or more embodiments will be discussed. Information handling system 600 of FIG. 6 may tangibly embody scanned beam display 100 as shown in and described with respect to FIG. 1, FIG. 2, and/or FIG. 5, at least in part, and/or scanned beam display 100 may be integrated with information handling system 600. Although information handling system 600 represents one example of several types of computing platforms, including cell phones, personal digital assistants (PDAs), netbooks, notebooks, internet browsing devices, tablets, pads, and so on, information handling system 600 may include more or fewer elements and/or different arrangements of the elements than shown in FIG. 6, and the scope of the claimed subject matter is not limited in these respects.

Information handling system 600 may comprise one or more processors such as processor 610 and/or processor 612, which may comprise one or more processing cores. One or more of processor 610 and/or processor 612 may couple to one or more memories 616 and/or 618 via memory bridge 614, which may be disposed external to processors 610 and/or 612, or alternatively at least partially disposed within one or more of processors 610 and/or 612. Memory 616 and/or memory 618 may comprise various types of semiconductor based memory, for example volatile type memory and/or non-volatile type memory. Memory bridge 614 may couple to a video/graphics system 620 to drive a display device, which may comprise display module 636, coupled to information handling system 600. Display module 636 may comprise scanned beam display 100 of FIG. 1, FIG. 2, and/or FIG. 5, at least in part, and may comprise an integrated photonics module (IPM) in some embodiments. In one or more embodiments, video/graphics system 620 may couple to one or more of processors 610 and/or 612 and may be disposed on the same core as the processor 610 and/or 612, although the scope of the claimed subject matter is not limited in this respect.

Information handling system 600 may further comprise input/output (I/O) bridge 622 to couple to various types of I/O systems. I/O system 624 may comprise, for example, a universal serial bus (USB) type system, an IEEE 1394 type system, or the like, to couple one or more peripheral devices to information handling system 600. Bus system 626 may comprise one or more bus systems such as a peripheral component interconnect (PCI) express type bus or the like, to connect one or more peripheral devices to information handling system 600. A hard disk drive (HDD) controller system 628 may couple one or more hard disk drives or the like to information handling system, for example Serial Advanced Technology Attachment (Serial ATA) type drives or the like, or alternatively a semiconductor based drive comprising flash memory, phase change, and/or chalcogenide type memory or the like. Switch 630 may be utilized to couple one or more switched devices to I/O bridge 622, for example Gigabit Ethernet type devices or the like. Furthermore, as shown in FIG. 6, information handling system 600 may include a baseband and radio-frequency (RF) block 632 comprising a base band processor and/or RF circuits and devices for wireless communication with other wireless communication devices and/or via wireless networks via antenna 634, although the scope of the claimed subject matter is not limited in these respects.

In one or more embodiments, information handling system 600 may include display module 636 that may correspond to scanned beam display 100 of FIG. 1, FIG. 2 and/or FIG. 5, and which may include any one or more or all of the components of scanned beam display 100 such as controller 522, horizontal drive circuit 518, vertical drive circuit 520, light source 110, and/or other mechanical and/or optical elements as discussed herein. In one or more embodiments, display module 636 may be controlled by one or more of processors 610 and/or 612 to implement some or all of the functions of controller 522 of FIG. 5. In one or more embodiments, display module 636 may comprise a MEMS based scanned laser display having a scanning platform 114 with one or more asymmetric flexures for displaying an image 640 projected by display module 636. In one or more embodiments, a scanned beam display 100 incorporated with information handling system 600 as projector module 636 may comprise video/graphics block 620 having a video controller to provide video information 638 to projector module 636 to display an image represented by image 640. However, these are merely example implementations for projector 636 within information handling system 600, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to a scanning platform having asymmetric flexures and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus, comprising:
a scanning platform comprising a frame;
a scanning mirror supported by a flexure coupled to the frame of the scanning platform;
wherein the flexure has an asymmetric structure to locate the scanning mirror at a position offset from a center of the frame; and
a housing having a first side, wherein the asymmetric structure of the flexure disposes the scanning platform closer to the first side of the housing than a position of the scanning platform with a symmetrical flexure.

2. An apparatus as claimed in claim 1, wherein the flexure comprises a first flexure arm and a second flexure arm, wherein a length of the first flexure arm is different from a length of the second flexure arm, or a cross-sectional area of the first flexure arm is different from a cross-sectional area of the second flexure arm, or combinations thereof.

3. An apparatus as claimed in claim 1, wherein the flexure comprises a first flexure arm and a second flexure arm, the first flexure arm being longer than the second flexure arm, or a cross-sectional area of the first flexure arm being larger than a cross-sectional area than the second flexure arm, or combinations thereof.

4. An apparatus as claimed in claim 1, wherein the flexure comprises a first flexure arm and a second flexure arm, the first flexure arm being longer than the second flexure arm and a cross-sectional area of the first flexure arm being larger than a cross-sectional area than the second flexure arm.

5. An apparatus as claimed in claim 1, wherein the flexure comprises a first flexure arm and a second flexure arm, wherein the position of the frame is determined by a length of the first flexure arm and the second flexure arm, and a resonant frequency of oscillation of the scanning mirror about the flexure is determined by a cross-sectional area of the first flexure arm or the second flexure arm, or combinations thereof.

6. An apparatus as claimed in claim 1, wherein the flexure comprises a longer flexure arm and a shorter flexure arm, and a resonant frequency of oscillation of the scanning mirror about the flexure is selected to the same or nearly the same as a resonant frequency of oscillation of the scanning mirror with a symmetrical flexure by increasing a cross-sectional area of the longer flexure arm or by decreasing a cross-sectional area of the shorter flexure arm, or combinations thereof.

7. An apparatus as claimed in claim 1, wherein the scanning platform comprises silicon or a similar material.

8. A scanned beam display, comprising:
a light source to generate a light beam to be scanned as a displayed image;
a first scanning platform to scan the light beam along a first axis; and
a second scanning platform to scan the light beam along a second axis;
wherein the first scanning platform or the second scanning platform, or combinations thereof, comprises:
a scanning platform comprising a frame;
a scanning mirror supported by an asymmetric flexure coupled to the frame of the scanning platform to locate the scanning mirror at a position offset from a center of the frame; and
a housing and an exit window disposed in the housing, wherein the asymmetric flexure disposes the scanning platform closer to the exit window than a position of the scanning platform with a symmetrical flexure.

9. A scanned beam display, comprising:
a light source to generate a light beam to be scanned as a displayed image;
a first scanning platform to scan the light beam along a first axis; and
a second scanning platform to scan the light beam along a second axis;
wherein the first scanning platform or the second scanning platform, or combinations thereof, comprises:
a scanning platform comprising a frame;
a scanning mirror supported by an asymmetric flexure coupled to the frame of the scanning platform to locate the scanning mirror at a position offset from a center of the frame; and
a housing having a first side, wherein the asymmetric flexure disposes the scanning platform closer to the first side of the housing than a position of the scanning platform with a symmetrical flexure.

10. A scanned beam display, comprising:
a light source to generate a light beam to be scanned as a displayed image;
a first scanning platform to scan the light beam along a first axis; and
a second scanning platform to scan the light beam along a second axis;
wherein the first scanning platform or the second scanning platform, or combinations thereof, comprises:
a scanning platform comprising a frame;
a scanning mirror supported by an asymmetric flexure coupled to the frame of the scanning platform to locate the scanning mirror at a position offset from a center of the frame; and
a housing, wherein the asymmetric flexure disposes the scanning platform at a position to result in the housing having a smaller size than the size of the housing that would result with a scanning platform having a symmetrical flexure.

11. An apparatus as claimed in claim 10, wherein the flexure comprises a first flexure arm and a second flexure arm, wherein a length of the first flexure arm is different from a length of the second flexure arm, or a cross-sectional area of the first flexure arm is different from a cross-sectional area of the second flexure arm, or combinations thereof.

12. An apparatus as claimed in claim 10, wherein the flexure comprises a first flexure arm and a second flexure arm, the first flexure arm being longer than the second flexure arm, or a cross-sectional area of the first flexure arm being larger than a cross-sectional area than the second flexure arm, or combinations thereof.

13. An apparatus as claimed in claim 10, wherein the flexure comprises a first flexure arm and a second flexure arm, the first flexure arm being longer than the second flexure arm and a cross-sectional area of the first flexure arm being larger than a cross-sectional area than the second flexure arm.

14. An apparatus as claimed in claim 10, wherein the flexure comprises a first flexure arm and a second flexure arm, wherein the position of the frame is determined by a length of the first flexure arm and the second flexure arm, and a resonant frequency of oscillation of the scanning mirror about the flexure is determined by a cross-sectional area of the first flexure arm or the second flexure arm, or combinations thereof.

15. An apparatus as claimed in claim 10, wherein the flexure comprises a longer flexure arm and a shorter flexure arm, and a resonant frequency of oscillation of the scanning mirror about the flexure is selected to the same or nearly the same as a resonant frequency of oscillation of the scanning mirror with a symmetrical flexure by increasing a cross-sectional area of the longer flexure arm or by decreasing a cross-sectional area of the shorter flexure arm, or combinations thereof.

16. An apparatus as claimed in claim 10, wherein the scanning platform comprises silicon or a similar material.

17. An information handling system, comprising:
a processor and a memory coupled to the processor;
a projector module coupled to the processor to display an image stored in the memory, wherein the projector module comprises:
a light source to generate a light beam to be scanned as a displayed image and a scanning platform to scan the light beam along a first axis;
wherein the scanning platform comprises a frame and a scanning mirror supported by an asymmetric flexure coupled to the frame of the scanning platform to locate the scanning mirror at a position offset from a center of the frame; and
a housing and an exit window disposed in the housing, wherein the asymmetric flexure disposes the scanning platform closer to the exit window than a position of the scanning platform with a symmetrical flexure.

18. An information handling system, comprising:
a processor and a memory coupled to the processor;
a projector module coupled to the processor to display an image stored in the memory, wherein the projector module comprises:
a light source to generate a light beam to be scanned as a displayed image and a scanning platform to scan the light beam along a first axis;
wherein the scanning platform comprises a frame and a scanning mirror supported by an asymmetric flexure coupled to the frame of the scanning platform to locate the scanning mirror at a position offset from a center of the frame; and a housing, wherein the asymmetric flexure disposes the scanning platform at a position to result in the housing having a smaller size than the size of the housing that would result with a scanning platform having a symmetrical flexure.

* * * * *